(12) United States Patent
Xu et al.

(10) Patent No.: US 11,762,432 B2
(45) Date of Patent: Sep. 19, 2023

(54) ROTATION SHAFT ASSEMBLY AND ELECTRONIC DEVICE

(71) Applicant: Lenovo (Beijing) Limited, Beijing (CN)

(72) Inventors: Lianfeng Xu, Beijing (CN); Feng Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/691,850

(22) Filed: Mar. 10, 2022

(65) Prior Publication Data

US 2023/0094599 A1    Mar. 30, 2023

(30) Foreign Application Priority Data

Sep. 28, 2021  (CN) .......................... 202111145305.8

(51) Int. Cl.
*G06F 1/16*  (2006.01)

(52) U.S. Cl.
CPC .......... *G06F 1/1681* (2013.01); *G06F 1/1679* (2013.01)

(58) Field of Classification Search
CPC .............................. G06F 1/1681; G06F 1/1679
See application file for complete search history.

(56) References Cited

U.S. PATENT DOCUMENTS

| | | | | |
|---|---|---|---|---|
| 10,817,020 B1 * | 10/2020 | DeMaio | ................ | G06F 3/1423 |
| 10,976,779 B1 * | 4/2021 | Tsai | ...................... | G06F 1/1615 |
| 10,990,125 B1 * | 4/2021 | Tsai | ...................... | G06F 1/1681 |
| 11,221,652 B2 * | 1/2022 | Tzou | ..................... | G06F 1/1649 |
| 11,262,794 B2 * | 3/2022 | Wen | ....................... | G06F 1/1616 |
| 11,543,858 B2 * | 1/2023 | Chen | ..................... | G06F 1/1624 |
| 2015/0363017 A1 * | 12/2015 | Sitbon | ....................... | G06F 1/18 |
| | | | | 361/679.21 |
| 2018/0275717 A1 * | 9/2018 | Ram | ...................... | G06F 1/1681 |
| 2019/0212778 A1 * | 7/2019 | Wu | ........................ | G06F 1/1677 |
| 2020/0278722 A1 * | 9/2020 | Hudgins | .............. | H05K 5/0247 |
| 2022/0004226 A1 * | 1/2022 | Yang | ................... | G06F 1/1681 |
| 2022/0283608 A1 * | 9/2022 | Xianyu | .................. | G06F 1/1673 |

* cited by examiner

*Primary Examiner* — Rockshana D Chowdhury
(74) *Attorney, Agent, or Firm* — ANOVA LAW GROUP, PLLC (57) ABSTRACT

A rotation shaft assembly includes a pivot assembly including a common rotation shaft, and a lock member, a first connection member, a second connection member, and a third connection member disposed at the common rotation shaft. The first connection member, the second connection member, and the third connection member are configured to be connected to a first member, a second member, and a third member, respectively. The lock member has a locked state that enables the first connection member and the second connection member to rotate synchronously, and an unlocked state that enables the first connection member and the second connection member to rotate independently with respect to each other.

17 Claims, 7 Drawing Sheets

ROTATION SHAFT ASSEMBLY AND ELECTRONIC DEVICE

CROSS-REFERENCE TO RELATED APPLICATION

This application claims priority to Chinese Patent Application No. 202111145305.8, filed on Sep. 28, 2021, the content of which is incorporated herein by reference in its entirety.

TECHNICAL FIELD

The present disclosure generally relates to the field of electronic devices and, more particularly, to a rotation shaft assembly and an electronic device.

BACKGROUND

A rotation shaft assembly is usually used in an electronic device to realize joint movement of multiple members. For example, a notebook computer includes a display end and a system end, and the display end and the system end are rotatably connected through a rotation shaft assembly. However, in the scenario where multiple members need to jointly move, an existing rotation shaft assembly cannot realize that at least two members can jointly move or can rotate independently. Therefore, the rotation shaft assembly has limitations in the scenario where multiple members need to jointly move and it is inconvenient for users to use.

SUMMARY

In accordance with the disclosure, there is provided a rotation shaft assembly including a pivot assembly including a common rotation shaft, and a lock member, a first connection member, a second connection member, and a third connection member disposed at the common rotation shaft. The first connection member, the second connection member, and the third connection member are configured to be connected to a first member, a second member, and a third member, respectively. The lock member has a locked state that enables the first connection member and the second connection member to rotate synchronously, and an unlocked state that enables the first connection member and the second connection member to rotate independently with respect to each other.

Also in accordance with the disclosure, there is provided an electronic device including a first member, a second member, a third member, and a rotation shaft assembly pivotally connecting the first member and the second member to a side of the third member. The rotation shaft assembly includes a pivot assembly including a common rotation shaft, and a lock member, a first connection member, a second connection member, and a third connection member disposed at the common rotation shaft. The first connection member, the second connection member, and the third connection member are connected to the first member, the second member, and the third member, respectively. The lock member has a locked state that enables the first connection member and the second connection member to rotate synchronously, and an unlocked state that enables the first connection member and the second connection member to rotate independently with respect to each other.

BRIEF DESCRIPTION OF THE DRAWINGS

In the drawings which are not necessarily to scale, same reference numbers may describe similar parts in different views. The same reference numbers with letter suffixes or different letter suffixes may denote different instances of similar components. The following drawings are merely examples for illustrative purposes according to various disclosed embodiments and are not intended to limit the scope of the present disclosure. When appropriate, the same reference numbers will be used throughout the drawings to refer to the same or like parts. Such embodiments are illustrative, and are not intended to be exhaustive or exclusive embodiments of the present disclosure.

REFERENCE NUMERALS

100— Rotation shaft assembly, 200— Electronic device,
1— First pivot assembly, 11— Common rotation shaft, 12— First connection member,
13— Second connection member, 14— Third connection member,
2— Lock member, 21— Lock cam, 22— Lock groove, 23— Elastic member,
3— Second pivot assembly, 4— Third pivot assembly, 5— First member,
6— Second member, 7— Third member

DETAILED DESCRIPTION OF THE EMBODIMENTS

Hereinafter, embodiments and features consistent with the disclosure will be described with reference to drawings. Various modifications may be made to the embodiments of the present disclosure. Thus, the described embodiments should not be regarded as limiting, but are merely examples. Those skilled in the art will envision other modifications within the scope and spirit of the present disclosure.

In the present disclosure, "first," "second," or similar words used herein do not denote any order, quantity, or importance, but are merely used to distinguish the different parts. "comprising," "including" or similar words mean that the element preceding the words covers the elements listed after the word, and do not exclude the possibility that other elements are also covered. "up," "down," "left," "right," or similar words are only used to indicate the relative positional relationship, and when the absolute position of the described object changes, the relative positional relationship may also change accordingly.

In the present disclosure, when it is described that a specific device is located between a first device and a second device, an intermediate device may or may not exist between the specific device and the first device or the second device. When it is described that a specific device is connected to other devices, the specific device may be directly connected to the other device without intermediate devices, or may not be directly connected to the other device but have intermediate devices.

All terms (including technical or scientific terms) used in the present disclosure have the same meaning as understood by those skilled in the art to which the present disclosure belongs, unless otherwise specifically defined. Terms defined in, for example, general dictionaries should be understood to have meanings consistent with their meanings in the context of the related art and not to be interpreted in an idealized or highly formalized sense unless explicitly stated or defined.

Techniques, methods, and devices known to those skilled in the relevant art may not be discussed in detail, but where appropriate, such techniques, methods, and devices should be considered part of the present disclosure.

The present disclosure provides a rotation shaft assembly 100 configured to connect a first member 5, a second member 6, and a third member 7. The rotation shaft assembly 100 may be applied to an electronic device 200 or another device that needs to use the rotation shaft assembly 100 to realize a rotational connection between members. The above-mentioned electronic device 200 may include but is not limited to terminals such as mobile phones, tablet computers, notebook computers, personal computers (PCs), wearable devices, or augmented reality (AR)/virtual reality (VR) devices.

The embodiments where the rotation shaft assembly 100 is applied to the electronic device 200 are used as examples to illustrate the present disclosure, and do not limit the scope of the present disclosure. The electronic device 200 includes the first member 5, the second member 6, and the third member 7. The first member 5 and the second member 6 are both pivotally connected to the third member 7. In one embodiment, the first member 5 and the second member 6 may be pivotally connected to a same side of the third member 7. In some embodiments, the first member 5 may be a first display terminal, the second member 6 may be a second display terminal, and the third member 7 may be a system terminal, in a product such as a dual-screen mobile phone or a dual-screen notebook computer.

The embodiments where the electronic device 200 is a notebook computer will be used as examples to illustrate the present disclosure, and do not limit the scope of the present disclosure. The scope of application of the rotation shaft assembly 100 of the present disclosure is not limited to this.

Figure 1:
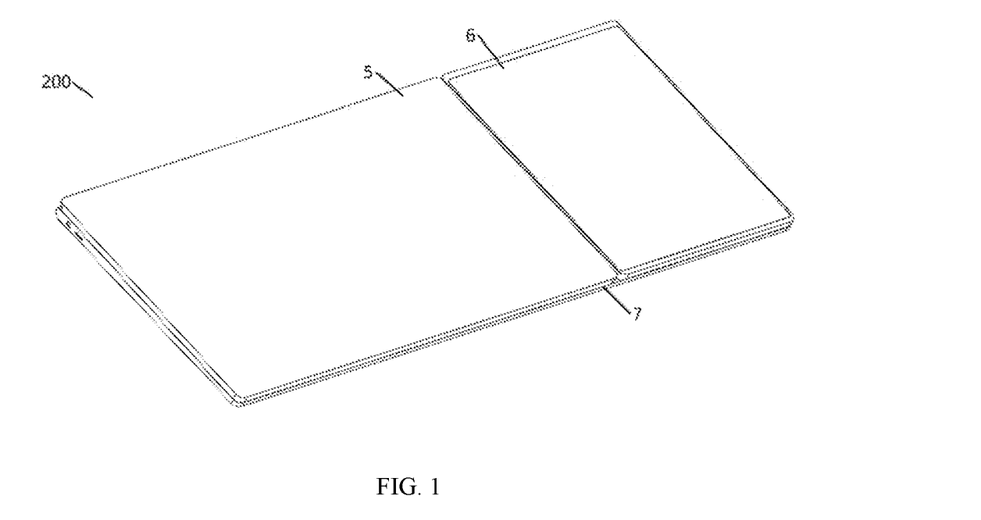
FIG. 1 is a schematic structural diagram of an example electronic device including a rotation shaft assembly and in a closed state consistent with the present disclosure.
Figure 2:
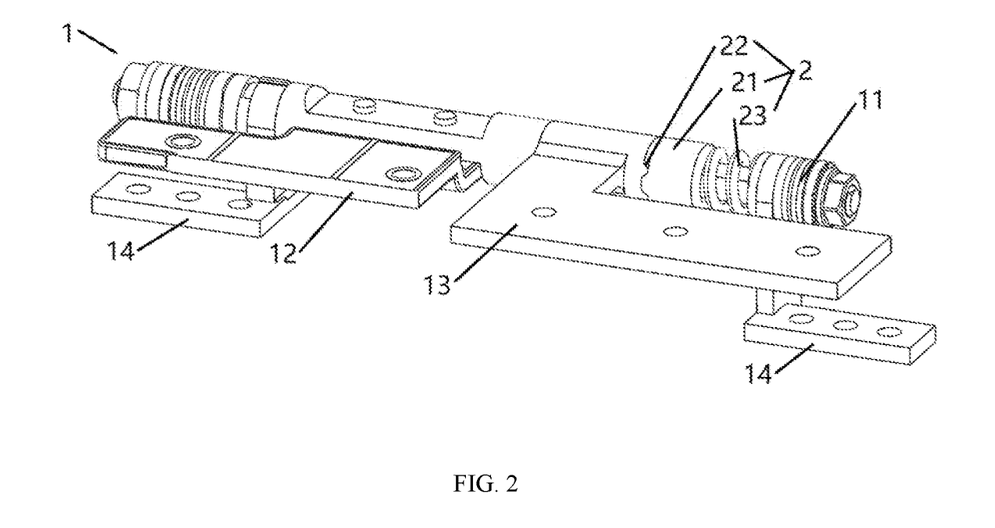
FIG. 2 is a schematic structural diagram of an example rotation shaft assembly when the electronic device is in a closed state consistent with the present disclosure.
Figure 5:
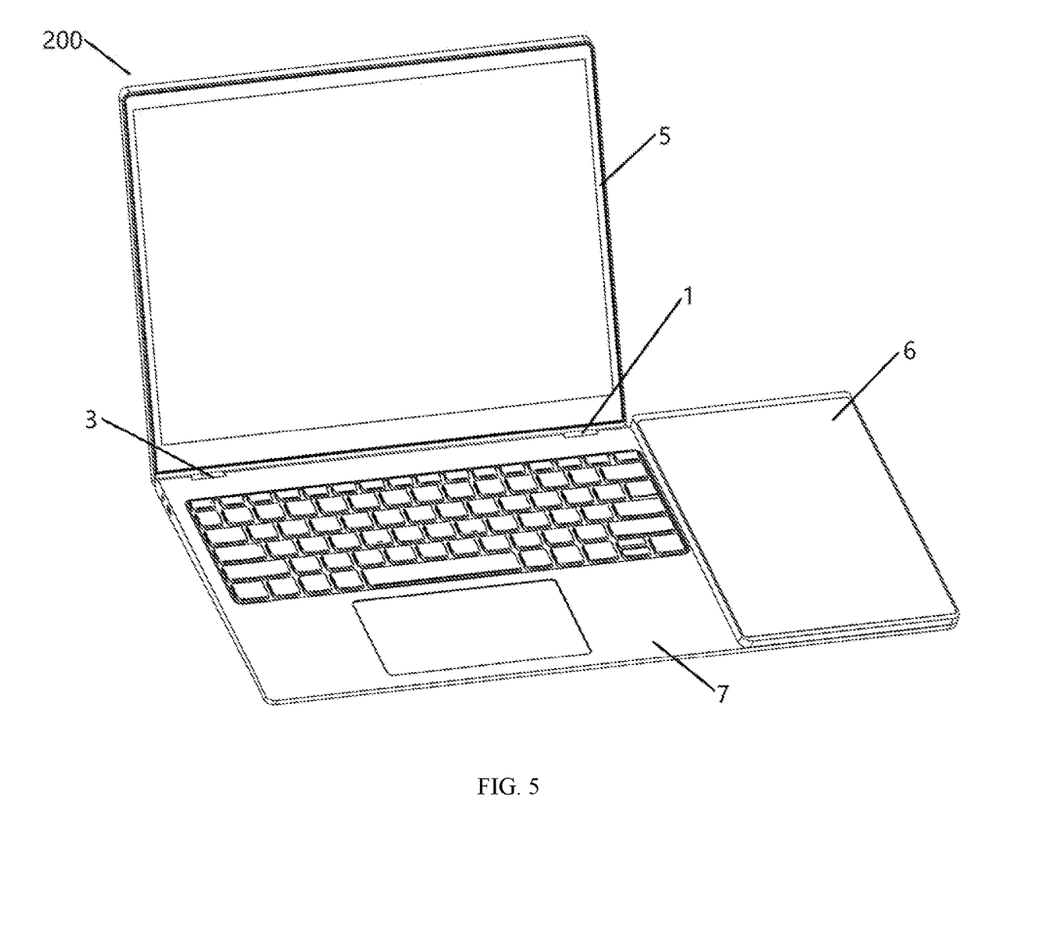
FIG. 5 is a schematic structural diagram of an example electronic device including a rotation shaft assembly and in a first single-screen display state consistent with the present disclosure.
Figure 6:
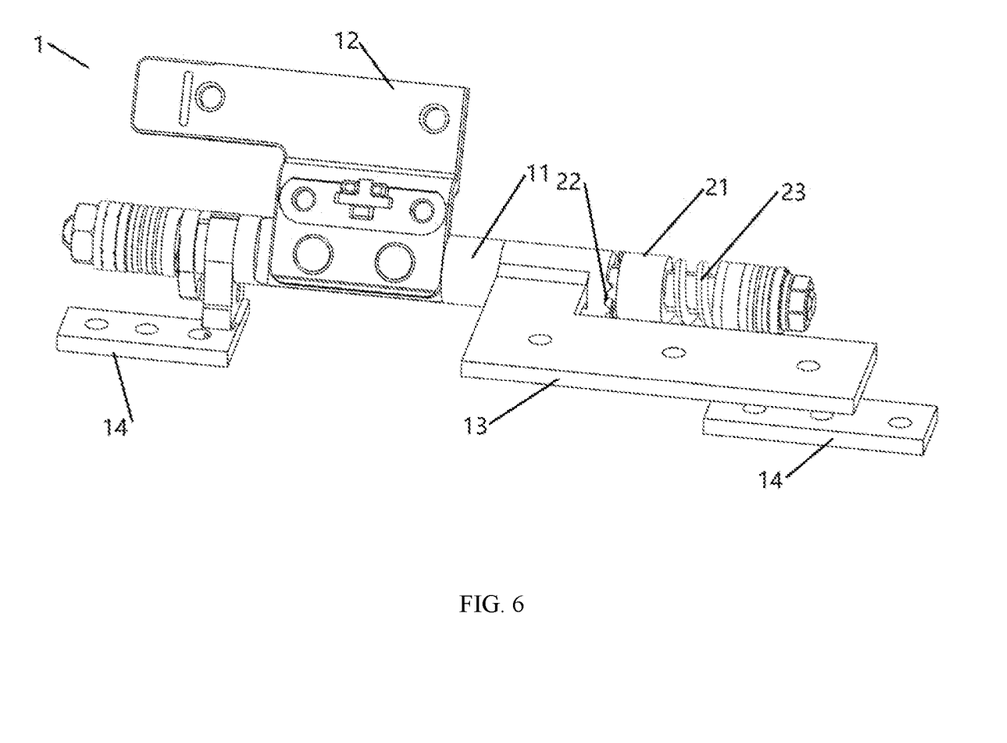
FIG. 6 is a schematic structural diagram of an example rotation shaft assembly when the electronic device is in a first single-screen display state consistent with the present disclosure.
Figure 7:
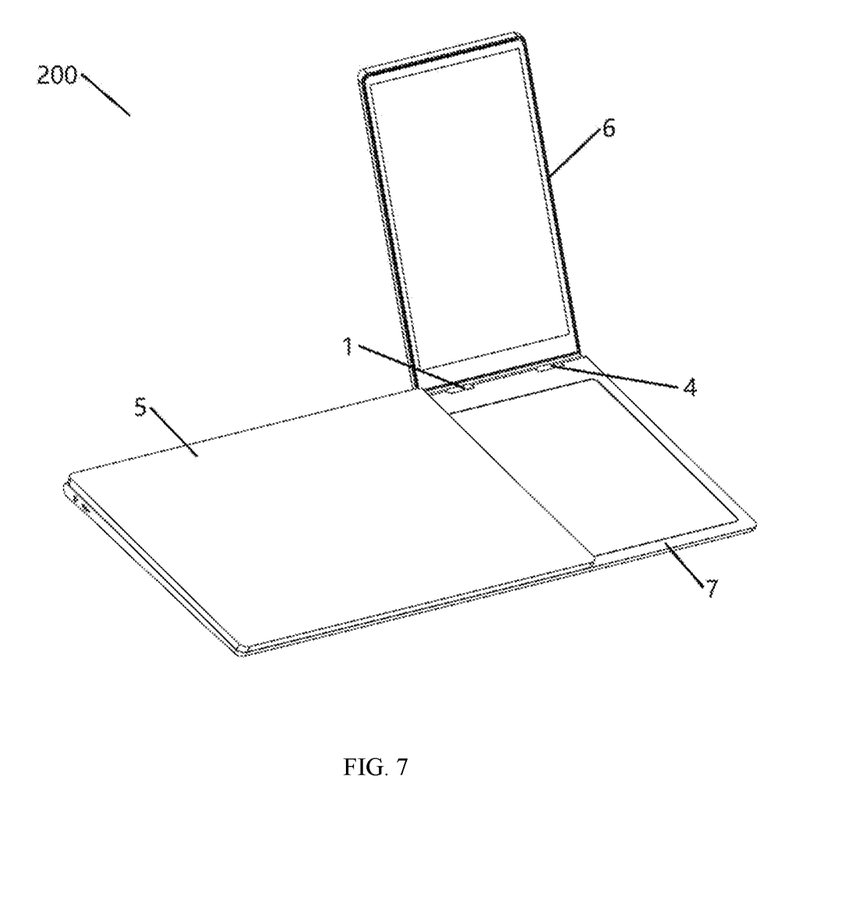
FIG. 7 is a schematic structural diagram of an example electronic device including a rotation shaft assembly and in a second single-screen display state consistent with the present disclosure.
Figure 8:
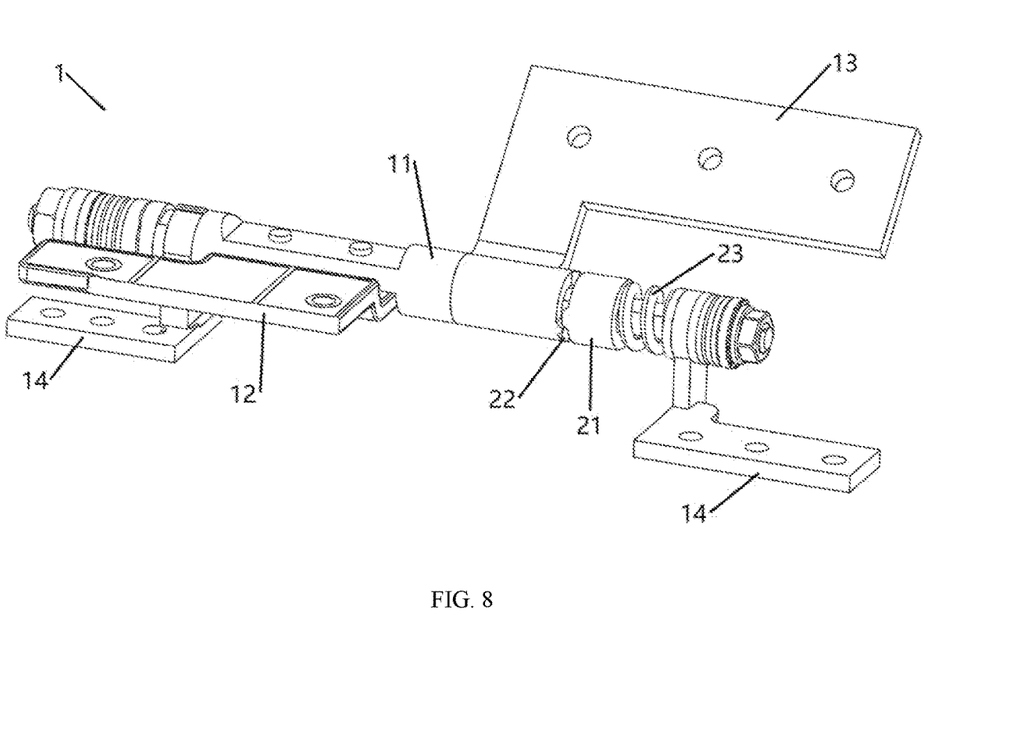
FIG. 8 is a schematic structural diagram of an example rotation shaft assembly when the electronic device is in a second single-screen display state consistent with the present disclosure.

The electronic device 200 may have at least a closed state, a dual-screen display state, a first single-screen display state, and a second single-screen display state. FIGS. 1 and 2 are schematic structural diagrams of the electronic device 200 in the closed state, FIGS. 3 and 4 are schematic structural diagrams of the electronic device 200 in the dual-screen display state, FIGS. 5 and 6 are schematic structural diagrams of the electronic device 200 in the first single-screen display state, and FIGS. 7 and 8 are structural schematic diagrams of the electronic device 200 in the second single-screen display state.

Specifically, the first member 5 may be a main display screen of the electronic device 200, and the second member 6 may be a secondary display screen of the electronic device 200. In the first single-screen display state, the main display screen may be in an open state, and the secondary display screen may be in a closed state. In the second single-screen display state, the secondary display screen may be in the open state, and the main display screen may be in the closed state.

Further, the rotation shaft assembly 100 includes a first pivot assembly 1. The first pivot assembly 1 includes a common rotation shaft 11, as well as a lock member 2, a first connection member 12, a second connection member 13, and a third connection member 14 provided at the common rotation shaft 11. The first connection member 12, the second connection member 14, and the third connection member 14 are respectively connected to the first member 5, the second member 6, and the third member 7. The lock member 2 may have a locked state in which the first connection member 12 and the second connection member 13 are capable of rotating synchronously, and an unlocked state in which the first connection member 12 and the second connection member 13 are capable of rotating independently with respect to each other.

Figure 3:
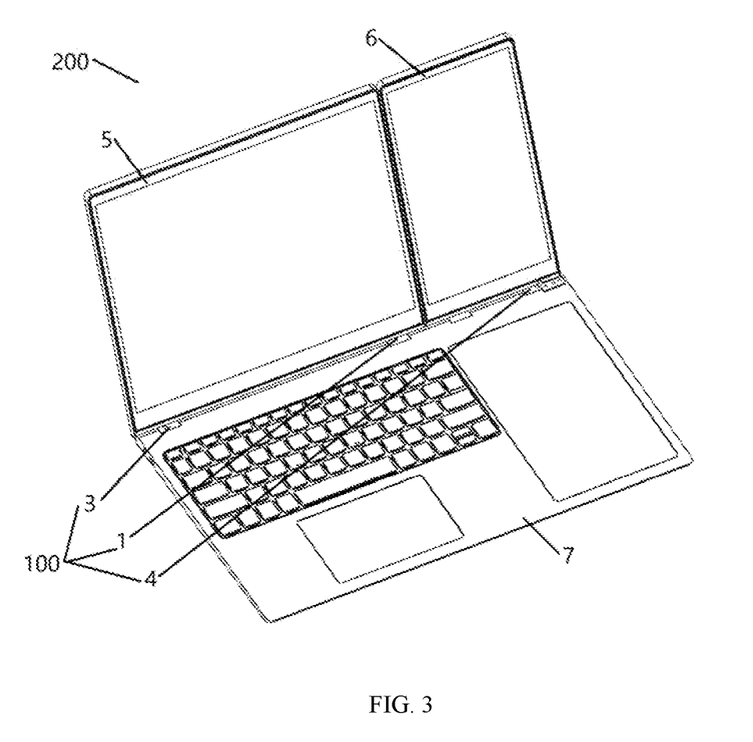
FIG. 3 is a schematic structural diagram of an example electronic device including a rotation shaft assembly and in a dual-screen display state consistent with the present disclosure.
Figure 4:
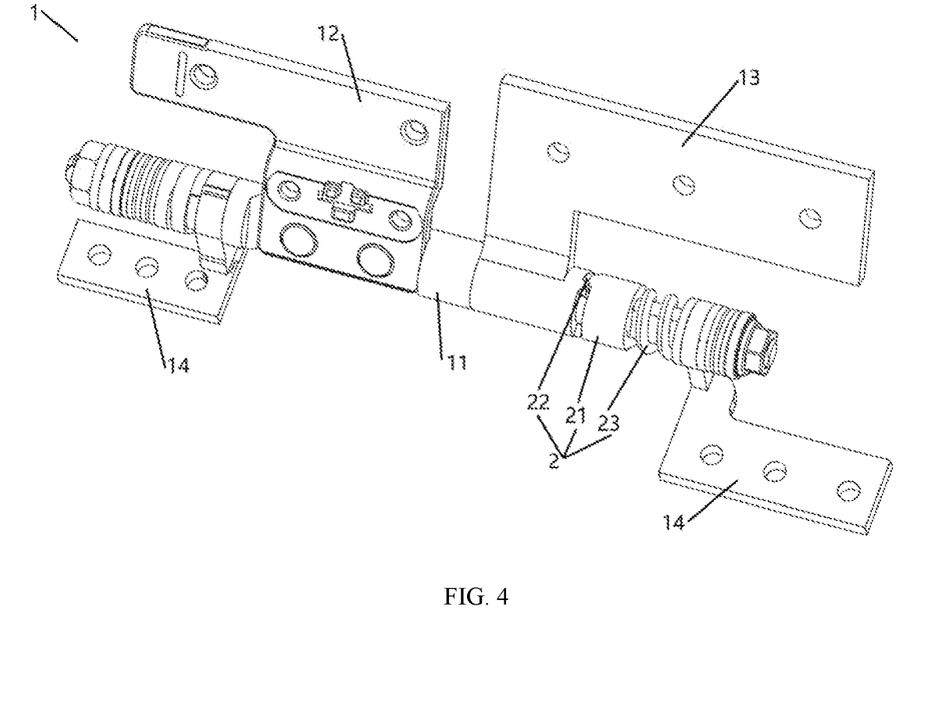
FIG. 4 is a schematic structural diagram of an example rotation shaft assembly when the electronic device is in a dual-screen display state consistent with the present disclosure.

In one embodiment, as shown in FIGS. 3 and 4, the first member 5 and the second member 6 are pivotally connected to a same side of the third member 7, and the first member 5 and the second member 6 are arranged side by side. The common rotation shaft 11 is disposed at a side where the first member 5, the second member 6 and the third member 7 are close to each other, such that the first member 5, the second member 6 and the third member 7 are connected by the first pivot assembly 1.

In existing technologies, the first member 5 and the second member 6 are respectively connected to the third member 7 by different pivot structures, which makes it difficult to align the first member 5 and the second member 6 when assembling the electronic device 200 and increases assembly difficulty. In the present disclosure, the common rotation shaft 11 may be adopted in the first pivot assembly 1 to reduce the assembly difficulty. The first member 5 and the second member 6 may be both installed on the common rotation shaft 11 and there may be no need for manual alignment, which may effectively simplify the assembly process.

The lock member 2 shown in FIGS. 2 and 4 is in a locked state, and the lock member 2 shown in FIGS. 6 and 8 is in an unlocked state. In one embodiment shown in FIG. 2, the rotation shaft assembly includes two third connection members 14, and the first pivot assembly 1 is connected to the third member 7 through the two third connection members 14. Therefore, the stability of the first pivot assembly in assembling on the third member 7 may be increased, to improve the stability of the electronic device 200 during use.

In the present disclosure, the first member 5 may be connected to the first connection member 12, the second member 6 may be connected to the second connection member 13, and the third member 7 may be connected to the third connection member 14. The lock member 2 may have the locked state capable of driving the first connection member 12 and the second connection member 13 to rotate synchronously, and the unlocked state capable of driving the first connection member 12 and the second connection member 13 to rotate with respect to each other. Therefore, the first member 5 and the second member 6 connected to the rotation shaft assembly 100 and capable of relative rotation and synchronous rotation may be achieved, which is convenient for users to use and operate. Further, the first member 5, the second member 6, and the third member 7 may be all connected to the common rotation shaft 11, such that the relative positional relationship between the three may be stable, which is convenient for assembly and installation.

In the present disclosure, the locked state and unlocked state of the lock member 2 may be implemented in different ways, and will be illustrated by using the following embodiments as examples. The technical features of the various embodiments can be combined with each other without conflict to form other technical solutions that can realize the locked state and the unlocked state of the lock member 2.

In one embodiment, the lock member 2 may be disposed at the common rotation shaft 11, and may be configured such that the first connection member 12 and the common rotation shaft 11 have a locked relationship and an unlocked relationship. When the lock member 2 acts on the first connection member 12 and the lock member 2 is in the locked state, the lock member 2 may enable the first connection member 12 to have the locked relationship with the common rotation shaft 11, that is, enable the first connection member 12 to rotate with the first connection member 12. At this time, the second connection member 13 may be fixed at the common rotation shaft 11 or may be fixed with the common rotation shaft 11 through another connection structure. In short, the second connection member 13 may be able to rotate with the rotation of the common rotation shaft 11. Therefore, the lock member 2 may enable the first connection member 12 and the common rotation shaft 11 to have the locked relationship, such that the first connection member 12 and the second connection member 13 may both be able to rotate with the common rotation shaft 11 to achieve synchronous rotation.

Further, when the lock member 2 acts on the first connection member 12 and the lock member 2 is in the unlocked state, the lock member 2 may switch the locked relationship of the first connection member 12 and the common rotation shaft 11 to the unlocked relationship, that is, to allow the first connection member 12 to not rotate with the common rotation shaft 11. At this time, the second connection member 13 may be fixed at the common rotation shaft 11 or may be fixed with the common rotation shaft 11 through another connection structure. In short, the second connection member 13 may be able to rotate with the rotation of the common rotation shaft 11. Therefore, the lock member 2 may switch the locked relationship of the first connection member 12 and the common rotation shaft 11 to the unlocked relationship, to allow the first connection member 12 to not rotate with the common rotation shaft 11. At this time, the second connection member 13 may be able to follow the rotation of the common rotation shaft 11 and rotate. Therefore, the first connection member 12 and the second connection member 13 may be able to rotate relative to each other, to meet the user's needs for using the electronic device 20 in multiple states.

In another embodiment, the lock member 2 may be disposed at the common rotation shaft 11, and may be configured to enable the second connection member 13 and the common rotation shaft 11 have a locked relationship and an unlocked relationship. When the lock member 2 acts on the second connection member 13 and the lock member 2 is in the locked state, the lock member 2 may enable the second connection member 13 to have the locked relationship with the common rotation shaft 11, that is, enable the f second connection member 13 to rotate with the first connection member 12. At this time, the first connection member 12 may be fixed at the common rotation shaft 11 or may be fixed with the common rotation shaft 11 through another connection structure. In short, the first connection member 12 may be able to rotate with the rotation of the common rotation shaft 11. Therefore, the lock member 2 may enable the second connection member 13 and the common rotation shaft 11 to have the locked relationship, such that the first connection member 12 and the second connection member 13 may be able to both rotate with the common rotation shaft 11 to achieve synchronous rotation.

Further, when the lock member 2 acts on the second connection member 13 and the lock member 2 is in the unlocked state, the lock member 2 may switch the locked relationship of the second connection member 13 and the common rotation shaft 11 to the unlocked relationship, that is, to allow the second connection member 13 to not rotate with the common rotation shaft 11. At this time, the first connection member 12 may be fixed at the common rotation shaft 11 or may be fixed with the common rotation shaft 11 through another connection structure. In short, the first connection member 12 may be able to rotate with the rotation of the common rotation shaft 11. Therefore, the lock member 2 may switch the locked relationship of the second connection member 13 and the common rotation shaft 11 to the unlocked relationship, to allow the second connection member 13 to not rotate with the common rotation shaft 11. At this time, the first connection member 12 may be able to follow the rotation of the common rotation shaft 11 and rotate. Therefore, the first connection member 12 and the second connection member 13 may be able to rotate relative to each other, to meet the user's needs for using the electronic device 20 in multiple states.

In another embodiment, the lock member 2 may be disposed at the common rotation shaft 11, and may be configured to enable the first connection member 12 and the second connection member 13 to have a locked relationship and an unlocked relationship with the common rotation shaft 11 respectively. When the lock member 2 is in the locked state, the lock member 2 may lock the first connection member 12 and the second connection member 13 with the common ration shaft 11 respectively, to achieve the synchronous rotation of the first connection member 12 and the second connection member 13. When the locked member 2 switches from the locked state to the unlocked state, one of the first connection member 12 and the second connection member 13 may be locked with the common rotation shaft 11, and another one of the first connection member 12 and the second connection member 13 may be unlocked from the common rotation shaft 11, such that one of the first connection member 12 and the second connection member 13 may be able to rotate with the common rotation shaft 11 and another one of the first connection member 12 and the second connection member 13 may not rotate with the common rotation shaft 11. The relative rotation of the first connection member 12 and the second connection member 13 may be achieved.

A specific implementation of the embodiment where the lock member 2 is disposed at the common rotation shaft 11 and configured to enable the second connection member 13 and the common rotation shaft 11 have a locked relationship and an unlocked relationship will be described below as an example to illustrate the present disclosure.

In some embodiments, the second member 6 may be pivotally connected to the common rotation shaft 11 through the second connection member 13. As shown in FIGS. 1 to 4, when the lock member 2 is in the locked state, the lock member 2 acts on the second connection member 13 to allow the second connection member 13 to rotate with the common shaft 11. As shown in FIGS. 5 to 8, when the lock member 2 is in the unlocked state, the lock member 2 releases the action on the second connection member 13 such that the second connection member 13 and the common rotation shaft 11 can rotate relative to each other.

Specifically, a part of the structure of the lock member 2 may be integrally formed with the second connection member 13, or may be fixedly arranged at the second connection member 13. In some embodiments, a part of the structure of the lock member 2 may be integrally formed with the second connection member 13, such that a stable relative positional relationship may be maintained between the lock member 2 and the second connection member 13.

In some embodiments, a torque value capable of driving the rotation between the first member 5 and the third member 7 may be a first torque value, a torque value capable of unlocking the lock member 2 and the second connection member 13 may be a second torque value, and a torque value capable of driving the rotation between the part 6 and the third member 7 may be a third torque value. The first torque value, the second torque value, and the third torque value may decrease in this order.

In some embodiments, a range of the first torque value may be 4.2 kgf·cm to 4.8 kgf·cm, a range of the second torque value may be 4.0 kgf·cm to 4.2 kgf·cm, and a range of the third torque value may be 3.4 kgf·cm to 4.0 kgf·cm.

The first torque value, the second torque value, and the third torque value may decrease in this order. Correspondingly, when the user acts on the first member 5 to make it pivot relative to the third member 7, the lock member 2 may be in the locked state, and the second member 6 may be able to rotate synchronously with the first member 5 under the action of the lock member 2 (as shown in FIG. 3 and FIG. 4). When the user acts on the second member 6 to make it pivot relative to the third member 7, the lock member 2 may be in the unlocked state to unlock the second member 6 from the common rotation shaft 11 through the lock member 2, and the first member 5 may be in the closed state (as shown in FIG. 7 and FIG. 8). When the user acts on the first member 5 to make it pivot relative to the third member 7 and exerts force on the second member 6 to cause the second member 6 to be in the closed state, the lock member 2 may be in the unlocked state, and the second member 6 may not be able to rotate synchronously with the first member 5 (as shown in FIG. 5 and FIG. 6). In this way, various use states of the electronic device 200 may be realized. Further, when the user acts on the first member 5 independently, the second member 6 may be able to rotate synchronously with the first member 5 without the need for the user to exert force on the first member 5 and the second member 6 respectively, which improves the user experience.

In some embodiments, the first member 5 may be fixed at the common shaft 11 through the first connection member 12.

Specifically, the common rotation shaft 11 may be provided with an installation groove, and an installation plane may be formed at a groove bottom of the installation groove. The first connection member 12 may be detachably installed on the installation plane.

In some embodiments, the lock member 2 may include a lock cam 21 and a lock groove 22 that cooperate with each other. The lock groove 22 may be formed at the second connection member 13, and the lock cam 21 may be fixed at the common rotation shaft 11. A part of the lock cam 21 may be embedded in the lock groove 22 to form the locked state.

Specifically, the lock cam 21 may include a cam body and a protrusion on one end surface of the cam body. The cam body may be installed on the common rotation shaft 11 by key connection or other manners, such that the cam body may be fixed relative to the common rotation shaft 11 and be enabled to rotate relative to the common rotation shaft 11. When the lock member 2 is in the locked state, the protrusion may be embedded in the lock groove 22, such that the second connection member 13 can form the locked relationship with the common rotation shaft 11 through the lock member 2.

Specifically, a slope of the protrusion may be about 10 degrees, and a height of the protrusion in a direction perpendicular to the end surface of the cam body may be about 0.5 mm. Further, a diameter of an outer circumference of the cam body may be about 6 mm.

In some embodiments, the end surface of the cam body may be provided with a plurality of protrusions, and a plurality of lock grooves 22 may be provided in a one-to-one correspondence with the plurality of protrusions. In some embodiments, a number of the plurality of protrusions may be two, and the two protrusions may be arranged opposite to each other.

In some embodiments, the lock member 2 may further include an elastic member 23 for applying a force to the lock cam 21 to make it abut against the lock groove 22.

Specifically, the elastic member 23 may be a spring. When the protrusion of the lock cam 21 is separated from the lock groove 22, the force exerted by the spring on the lock cam 21 may need to be overcome, such that the relative relationship between the lock cam 21 and the lock groove 22 may be maintained in a stable state.

In some embodiments, the spring may be a compression spring, with a diameter of 1.5 mm, an original length of 13.5 mm, and a total number of turns of 6.

In some embodiments, the lock cam 21 may be located at a side of the second connection member 13 away from the first connection member 12, and the elastic member 23 may be located at a side of the lock cam 21 away from the second connection member 13.

Correspondingly, the lock cam 21 may be located at a side of the second connection member 13 away from the first connection member 12, such that the first connection member 12 and the second connection member 13 could be as close to each other as possible. Therefore, when one side of the first member 5 and one side of the second member 6 are attached to each other and arranged side by side, the connection stability of the first member with the third member 7 through the first connection member 12 may be increased, and the connection stability of the second member 6 with the third member 7 through the second connection member 13 may be increased.

In some embodiments, as shown in FIG. 3, FIG. 5, and FIG. 7, the first member 5 and the second member 6 are pivotally connected to one side of the third member 7, and the shaft assembly 100 further includes a second pivot assembly 3 and a third pivot assembly 4. The second pivot assembly 3 is configured to pivotally connect the third member 7 and a side of the first member 5 away from the first pivot assembly 1, and the third pivot assembly 4 is configured to pivotally connect the third member 7 and a side of the second member 6 away from the first pivot assembly 1.

In some embodiments, the second pivot assembly 3 may be disposed as far away as possible from the first pivot assembly 1, and the third pivot assembly 4 may also be disposed away from the first pivot assembly 1 as far as possible, such that the first member 5 and the second member 6 may be stably pivoted relative to the third member 7.

The present disclosure provides an electronic device 200. The electronic device 200 may include third member 7, a first member 5, and a second member 6 which are pivotally connected to one side of the third member 7. The electronic device 200 may further include a rotation shaft assembly 100 provided by various embodiments of the present disclosure. In the electronic device 200 using the rotation shaft assembly 100, the first member 5 may be connected to a first connection member 12, the second member 6 may be connected to a second connector 13, and the third member 7 may be connected to a third connector 14. A lock member 2 may have a locked state that enables the first connection member 12 and the second connection member 13 to rotate synchronously, and an unlocked state that enables relative rotation between the first connection member 12 and the second connection member 13. Therefore, the first member 5 and the second member 6 connected to the rotation shaft assembly 100 may be able to rotate relative to each other and also rotate synchronously, which is convenient for users to use and operate. In addition, the first member 5, the second member 6 and the third member 7 may be all connected to a common rotation shaft 11, such that the relative positional relationship between the three is stable, and is convenient for assembly and installation.

In some embodiments, the second member 6 may have a first display area and a second display area respectively located at opposite sides of the second member 6, such that the above electronic device 200 has a three-screen display function to meet various display needs of users.

Specifically, as shown in FIG. 3, when the electronic device 200 is in a dual-screen display state, the first display area on a first side of the second member 6 is located at a same plane as a display area of the first member 5. As shown in FIG. 1 and FIG. 5, the second display area on a second side of the second member 6 is used to present the display content when the second member 6 is in a closed state.

Exemplary embodiments of the present disclosure have been described herein, the scope of the present disclosure includes any and all embodiments with equivalent elements, modifications, omissions, combinations (e.g., crossovers of various embodiments), adaptations, or alterations based on the present disclosure. Elements in the claims are to be construed broadly based on the language employed in the claims, and are not to be limited to the examples described in this specification or during the practice of the present disclosure, the examples of which are to be construed as non-exclusive. Therefore, the present disclosure and the embodiments are intended to be regarded as examples only, with the true scope and spirit being indicated by the following claims along with their full scope of equivalents.

The above description is intended to be illustrative and not restrictive. For example, the above embodiments (or one or more of them) may be used in combination with each other. For example, other embodiments may be utilized by those of ordinary skill in the art upon reading the above description. Additionally, in the above embodiments, various features may be grouped together to simplify the present disclosure. This should not be construed as an intention that an unclaimed disclosed feature is essential to any claim. Rather, inventive subject matter may lie in less than all features of a particular disclosed embodiment. Thus, the following claims are hereby incorporated into the present disclosure by way of examples or embodiments, with each claim standing on its own as a separate embodiment, and it is contemplated that these embodiments may be combined with each other in various combinations or permutations.

Various embodiments have been used as examples to illustrate the operation principles and exemplary implementations, and do not limit the scopes of the present disclosure. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A rotation shaft assembly comprising:
   a pivot assembly including:
      a common rotation shaft; and
      a lock member, a first connection member, a second connection member, and a third connection member disposed at the common rotation shaft, with the lock member configured to be co-axial with the common rotation shaft;
   wherein:
      the first connection member, the second connection member, and the third connection member are configured to be connected to a first member, a second member, and a third member, respectively; and
      the lock member has:
         a locked state that enables the first connection member and the second connection member to rotate synchronously, and
         an unlocked state that enables the first connection member and the second connection member to rotate independently with respect to each other.

2. The rotation shaft assembly according to claim 1, wherein the lock member is configured to:
   in the locked state, act on the second connection member to allow the second connection member and the common rotation shaft to rotate synchronously; and
   in the unlocked state, release an action on the second connection member to allow the second connection member and the common rotation shaft to rotate relative to each other.

3. The rotation shaft assembly according to claim 2, wherein:
   a first torque value required to cause the first member and the third member to rotate relative to each other is larger than a second torque value required to unlock the second connection member from the lock member; and
   the second torque value is larger than a third torque value required to cause the second member and the third member rotate to rotate relative to each other.

4. The rotation shaft assembly according to claim 2, wherein the first connection member is configured to fix the first member at the common rotation shaft.

5. The rotation shaft assembly according to claim 2, wherein the lock member includes:
   a lock groove formed at the second connection member; and a lock cam fixedly arranged at the common rotation shaft and configured to be partially embedded in the lock groove to form the locked state.

6. The rotation shaft assembly according to claim 5, wherein the lock member further includes an elastic member configured to apply a force to the lock cam to cause the lock cam to abut against the lock groove.

7. The rotation shaft assembly according to claim 6, wherein:
the lock cam is located at a side of the second connection member away from the first connection member; and
the elastic piece is located at a side of the lock cam away from the second connection member.

8. The rotation shaft assembly according to claim 1, wherein the pivot assembly is a first pivot assembly;
the rotation shaft assembly further comprising:
a second pivot assembly configured to pivotally connect one side of the first member away from the first pivot assembly to one side of the third member; and
a third pivot assembly configured to pivotally connect one side of the second member away from the first pivot assembly to the one side of the third member.

9. An electronic device comprising:
a first member;
a second member;
a third member; and
a rotation shaft assembly pivotally connecting the first member and the second member to a side of the third member, the rotation shaft assembly including:
a pivot assembly including:
a common rotation shaft; and
a lock member, a first connection member, a second connection member, and a third connection member disposed at the common rotation shaft, with the lock member configured to be co-axial with the common rotation shaft;
wherein:
the first connection member, the second connection member, and the third connection member are connected to the first member, the second member, and the third member, respectively; and
the lock member has:
a locked state that enables the first connection member and the second connection member to rotate synchronously, and
an unlocked state that enables the first connection member and the second connection member to rotate independently with respect to each other.

10. The electronic device according to claim 9, wherein the second member includes a first display area and a second display area on two opposite surfaces of the second member respectively.

11. The electronic device according to claim 9, wherein the lock member is configured to:
in the locked state, act on the second connection member to allow the second connection member and the common rotation shaft to rotate synchronously; and
in the unlocked state, release an action on the second connection member to allow the second connection member and the common rotation shaft to rotate relative to each other.

12. The electronic device according to claim 11, wherein:
a first torque value required to cause the first member and the third member to rotate relative to each other is larger than a second torque value required to unlock the second connection member from the lock member; and
the second torque value is larger than a third torque value required to cause the second member and the third member rotate to rotate relative to each other.

13. The electronic device according to claim 11, wherein the first connection member fixes the first member at the common rotation shaft.

14. The electronic device according to claim 11, wherein the lock member includes:
a lock groove formed at the second connection member; and
a lock cam fixedly arranged at the common rotation shaft and configured to be partially embedded in the lock groove to form the locked state.

15. The electronic device according to claim 14, wherein the lock member further includes an elastic member configured to apply a force to the lock cam to cause the lock cam to abut against the lock groove.

16. The electronic device according to claim 15, wherein:
the lock cam is located at a side of the second connection member away from the first connection member; and
the elastic piece is located at a side of the lock cam away from the second connection member.

17. The electronic device according to claim 9, wherein the pivot assembly is a first pivot assembly; and
the rotation shaft assembly further includes:
a second pivot assembly pivotally connects one side of the first member away from the first pivot assembly to one side of the third member; and
a third pivot assembly pivotally connects one side of the second member away from the first pivot assembly to the one side of the third member.

* * * * *